(No Model.)
J. M. MAST.
ANIMAL TRAP.
No. 600,156.  Patented Mar. 8, 1898.
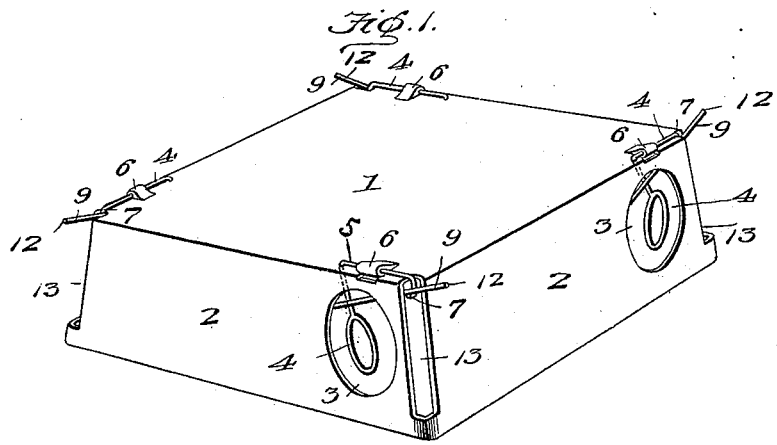
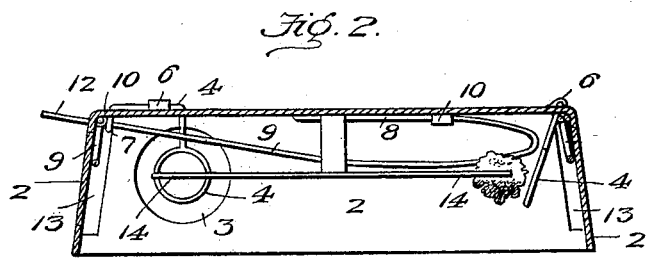
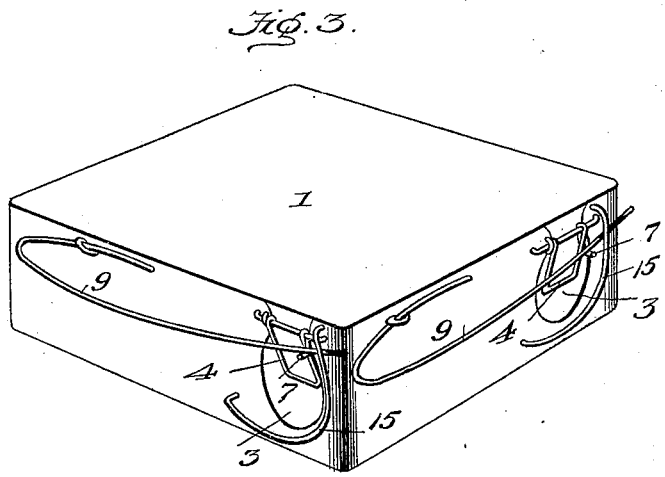
Witnesses  Inventor
            John M. Mast.
            By H. B. Willson
            Attorney

UNITED STATES PATENT OFFICE.

JOHN M. MAST, OF LANCASTER, PENNSYLVANIA.

ANIMAL-TRAP.

SPECIFICATION forming part of Letters Patent No. 600,156, dated March 8, 1898.

Application filed April 19, 1897. Serial No. 632,818. (No model.)

*To all whom it may concern:*

Be it known that I, JOHN M. MAST, a citizen of the United States, residing at Lancaster, in the county of Lancaster and State of Pennsylvania, have invented certain new and useful Improvements in Mouse-Traps; and I do declare the following to be a full, clear, and exact description of the invention, such as will enable others skilled in the art to which it appertains to make and use the same.

My invention has relation to animal-traps; and the object is to provide a simple and reliable device of this class.

To this end the novelty consists in the construction, combination, and arrangement of the same, as will be hereinafter more fully described, and particularly pointed out in the claim.

In the accompanying drawings the same reference-numerals indicate the same parts of the invention.

Figure 1 is a perspective view of my improved trap. Fig. 2 is a sectional view of the same, and Fig. 3 is a modification.

1 represents a sheet-metal frame, the walls 2 2 of which are each provided with a circular orifice 3, which forms the entrance to the bait-chamber. An oscillating circular trigger 4 is formed integral with a horizontal arm 5, journaled in the frame and held in place by an ear 6, the opposite end of the trigger-arm being turned to form a hook 7. The shorter arm 8 of a spring 9 is secured in the frame by the integral lip 10, and its free end 12 passes across the orifice 3 and projects a short distance through a vertical slot 13 in the corner of the frame.

14 represents a stud on which the bait is secured.

To set the trap, the end 12 of the spring 9 is raised until it engages the hook 7 and thus sets the trigger 4, and the animal in its effort to reach the bait forces the trigger inwardly, the hook 7 of which releases the spring 9, which strikes the animal and confines it in the orifice 3.

In the modification a block is used instead of the metal frame, and the free end of the spring passes between the end of the block and a wire guard 15, which takes the place of the slot 13 in the preferred construction.

A special feature of my improved trap is the fact that the animal in its attempt to reach the bait must press the trigger inward and thus enter a sufficiently large portion of its body into the trap to insure its capture when the trap is sprung.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

A trap comprising a frame, the combined trigger and choker 4, having an integral arm journaled to said frame, the terminal end of said arm bent into a hook 7, in combination with a spring-wire striker 9, held above the bait-orifice by the hook 7, and released by the swinging movement of the combined trigger and choker, substantially as described.

In testimony whereof I hereunto affix my signature in presence of two witnesses.

JOHN M. MAST.

Witnesses:
J. S. JEFFERIES,
H. A. NEHR.